(12) United States Patent
Northrup

(10) Patent No.: US 10,672,529 B1
(45) Date of Patent: Jun. 2, 2020

(54) COMPACT SPECTROMETER FOCUSING APPARATUS

(71) Applicant: The Research Foundation for The State University of New York, Albany, NY (US)

(72) Inventor: Paul Northrup, Eastport, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 512 days.

(21) Appl. No.: 15/587,810

(22) Filed: May 5, 2017

Related U.S. Application Data

(60) Provisional application No. 62/332,118, filed on May 5, 2016.

(51) Int. Cl.
  *G21K 1/06* (2006.01)
  *G01N 23/20008* (2018.01)

(52) U.S. Cl.
  CPC ......... *G21K 1/06* (2013.01); *G01N 23/20008* (2013.01)

(58) Field of Classification Search
  CPC ..................... G21K 1/06; G01N 23/20008
  See application file for complete search history.

(56) References Cited

U.S. PATENT DOCUMENTS

| | | | |
|---|---|---|---|
| 6,668,039 B2 | 12/2003 | Shepard et al. | |
| 2009/0252294 A1 | 10/2009 | O'Hara | |
| 2013/0108022 A1 | 5/2013 | Kugland et al. | |
| 2014/0294157 A1* | 10/2014 | Chen | G01N 23/223 378/145 |
| 2017/0052128 A1* | 2/2017 | Yun | G01N 23/20058 |

OTHER PUBLICATIONS

Shevelko, A. et al., X-Ray Focusing Crystal Von Hamos Spectrometer with a CCD Linear Array as a Detector, Copyright (c)JCPDS—International Centre for Diffraction Data 2002 Advances in X-ray Analysis, vol. 45, pp. 433-440.
Ishikawa, D. et al., Temperature gradient analyzers for compact high-resolution X-ray spectrometers, Journal of Synchrotron Radiation (2010), pp. 12-24.
Turner, D. Clark et al., Focusing Crystal Von Hamos Spectrometers for XRF Applications, Copyright (c)JCPDS—International Centre for Diffraction Data 2001, Advances in X-ray Analysis, vol. 44, pp. 329-335.

* cited by examiner

*Primary Examiner* — Chih-Cheng Kao
(74) *Attorney, Agent, or Firm* — The Farrell Law Firm, P.C.; John F. Gallagher, III

(57) ABSTRACT

A spectrometer focusing apparatus is provided that includes a hollow cylinder for x-rays to traverse a length thereof, a defracting element configured as a ring on an interior circumference of a portion of the hollow cylinder, at least one disk having an edge defining a circle aligned with the defracting element, and an aperture formed between the defracting element and the edge of the at least one disk.

13 Claims, 5 Drawing Sheets

COMPACT SPECTROMETER FOCUSING APPARATUS

PRIORITY

This application claims priority to U.S. Provisional Patent Application No. 62/332,118 filed on May 5, 2016, the entire content of which is incorporated herein by reference.

BACKGROUND

1. Field of the Invention

The present invention relates generally to x-ray spectroscopy and, more particularly, to an apparatus for focusing a von Hamos type crystal x-ray spectrometer, and a method for operation of same.

2. Description of the Related Art

X-ray detectors fall into three general categories. Counting detectors do not discriminate different x-ray energy, i.e., wavelength. Energy-dispersive detectors, e.g., solid-state silicon or germanium, can discriminate x-ray energy with a limited resolution of approximately 150 eV. These two types of x-ray detectors are relatively simple and easy to use. Diffractive detection employs crystal spectrometers of various geometries, with energy resolution greater than 1 eV.

However, diffractive detection devices are generally large, complex and expensive.

An x-ray spectrometer is an optical device used to resolve and select different x-ray photon energies. The x-ray spectrometer operates by using a diffractive crystal which, for any given angle, diffracts x-rays of a specific energy according to the Bragg equation (a):

$$\text{wavelength} = 2d \sin \Theta, \qquad (1)$$

where d is crystallographic spacing of the diffracting crystal, and $\Theta$ is an angle that the x-ray is incident on the crystallographic plane.

A von Hamos x-ray spectrometer includes an x-ray source defined by a rectangular slit, a cylindrically bent crystal, and a position sensitive detector located on a crystal axis of curvature. The crystal is bent cylindrically around a horizontal axis, parallel to a direction of dispersion. The crystal provides focusing in a vertical direction. A front surface of the detector, the slit axis and the axis of curvature are all positioned along a same vertical plane. For a fixed position of the components, an incident x-ray location on the detector corresponds geometrically to a particular Bragg angle and therefore to a particular x-ray energy.

J. Hoszowska, et al., High resolution von Hamos Crystal x-ray Spectrometer, Nucl. Instr. Meth. A 376 (1996) 129, discloses a von Hamos spectrometer that uses a segment of cylindrically curved crystal to focus diffracted x-rays along a line, with different energies diffracted at different positions along the line. The different energies are selected by tuning an aperture along the line or using a detector capable of spatially resolving intensity along the line.

The von Hamos geometry permits the spectrometer to collect data over an energy bandwidth (30-300 eV), limited primarily by the detector length, for one position of the components thereof. Study of a greater energy interval is performed by adjusting a central Bragg angle by translation of the crystal and corresponding translation of the detector along their axes. Different crystals are used at different angular specifications to allow the spectrometer to observe x-rays in an expanded energy range from 0.547 to 16.8 keV.

U.S. Publ. No. 2009/0252294 of O'Hara discloses a scanning von Hamos type x-ray spectrometer in which a crystal is bent into a cylindrical surface, with the source and detector plane on an axis of the cylinder. O'Hara selects energy, i.e., wavelength, by scanning a set of apertures to limit the angle that x-rays pass to the diffractor. When the device of O'Hara scans, the detector position remains at a single point of focus.

However, conventional systems lack portability and are complex in the required operation and control of numerous components. Also, conventional systems diffract from a same place along the diffractor, eliminating any variation in efficiency that might arise from differences along the diffractor.

SUMMARY OF THE INVENTION

To resolve the drawbacks and disadvantages of conventional systems, the apparatus and method of the present disclosure provides a portable device that uses only an apparatus formed along a perimeter of a disk to limit an angle of incidence, and selects energy by scanning an entire detector/spectrometer assembly toward or away from a sample.

According to one aspect of the present invention, a medium resolution, i.e., 10-100 eV, spectrometer is provided that includes a hollow cylinder for x-rays to traverse a length thereof, a defracting element configured as a ring on an interior circumference of a portion of the hollow cylinder, at least one disk having an edge defining a circle aligned with the defracting element, and an aperture formed between the defracting element and the edge of the at least one disk.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION

Embodiments of the present disclosure are described in detail with reference to the accompanying drawings. Detailed descriptions of constructions or processes known in the art may be omitted to avoid obscuring the subject matter of the present disclosure. Further, in the following description of the present disclosure, various specific definitions found in the following description are provided to provide a general understanding of the present disclosure, and it is apparent to those skilled in the art that the present disclosure can be implemented without such definitions.

Figure 1:
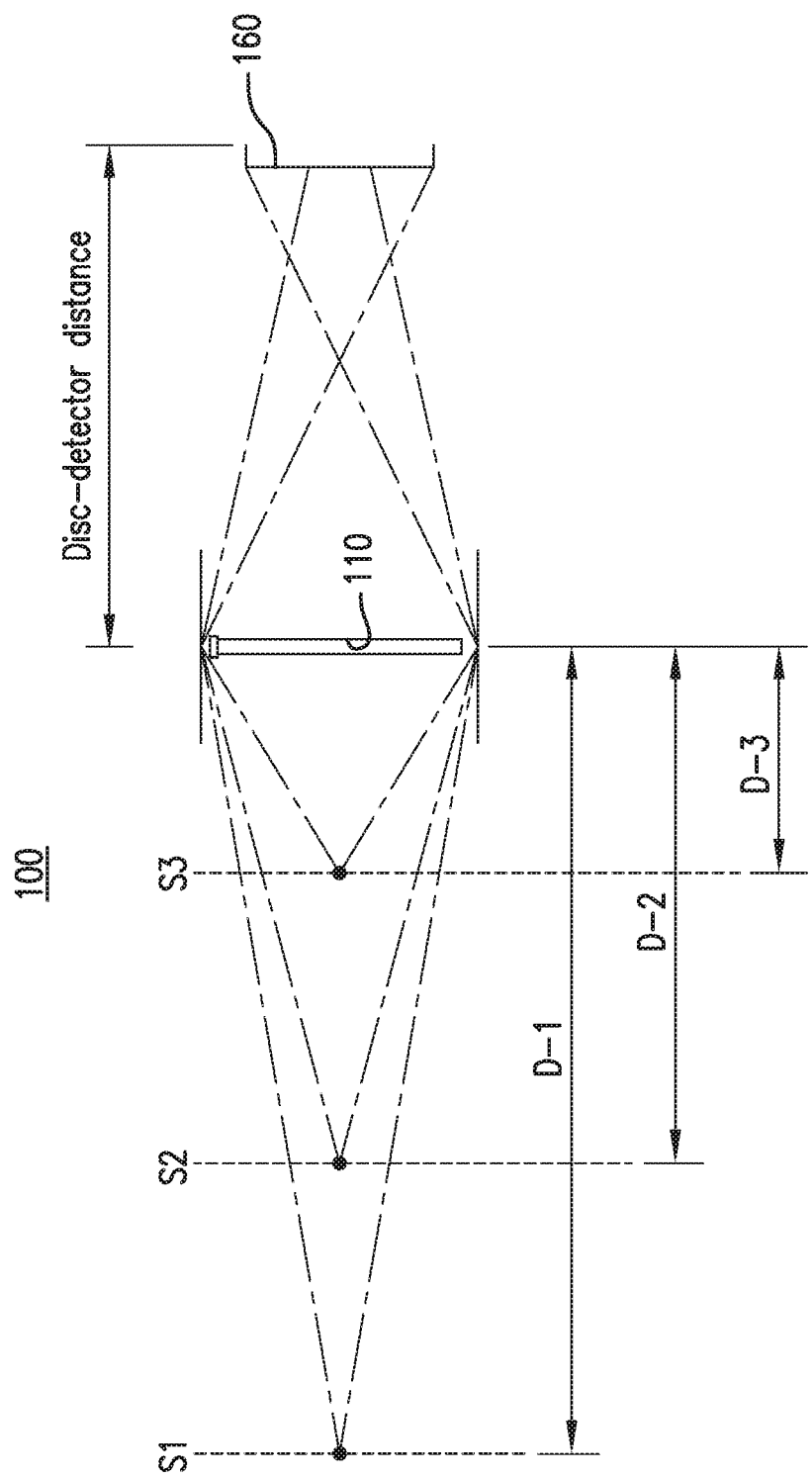
FIG. 1 is a profile view illustrating components of an embodiment of an apparatus of the present disclosure.

FIG. 1 is a profile view illustrating components of an embodiment of an apparatus of the present disclosure. As shown in FIG. 1, a spectrometer focusing apparatus is provided that includes a hollow cylinder configured for x-rays to traverse a length thereof. A defracting element 120 (FIG. 4), e.g., a crystal, defines an interior circumference on a portion of the hollow cylinder. At least one disk 110 is provided having an edge defining a circle aligned with the defracting element 120. An aperture 115 (FIG. 4) is formed between the defracting element and the edge of the at least one disk 110.

The spectrometer focusing apparatus 100 is provided for use with a medium resolution, i.e., 10-100 eV, spectrometer, and uses a defracting element 120 that is bent along an interior portion of a complete inner circumference of the hollow cylinder 320 (FIGS. 5-6), forming a ring. Energy is selected by translation of the apparatus along a line, i.e., an optic axis 140, from a position S1, S2, S3 of an x-ray source 150 to a detector 160, with a position of the x-ray source 150 (FIG. 3) defining an angle of incidence of x-rays transmitted from the source through the aperture 115 to the detector 160. The same ring is used for all energies transmitted through the apparatus.

In the apparatus of the present disclosure, the Bragg angle is not selected at a focus. Rather, the Bragg angle is selected at the crystal, using an opaque disk spaced apart from a surface of the crystal.

A distance D1, D2, D3 between the disk 110 and a position S1, S2, S3 of the source 150 defines an angle of incidence, and consequently defines a corresponding energy. Diffracted x-rays are measured by the detector 160, which is positioned downstream from the disk 110 and the source 150.

In FIG. 1, a distance between detector 160 and disk 110 is fixed. The distance between the detector 160 and the source (S1, S2, S3) allows for portability of the spectrometer focusing apparatus 100 and facilitates attachment of the spectrometer focusing apparatus 100 to various detector types, with the spectrometer focusing apparatus 100 being configured to directly mount onto the detector 160. The cylinder 320 is configured to attach to one of a counting detector, an energy-dispersive detector, and a Canberra Ge solid-state detector. When attached to the detector, improved energy resolution of the spectrometer is realized of approximately 10 eV to 100 eV, without adding any moving parts.

As the detector 160 and spectrometer focusing apparatus 100 are moved toward a source 150, the angle of incidence increases and the diffracted x-rays are focused short of the detector 160, with the x-rays still being measured by the detector 160. When the spectrometer focusing apparatus 100 and detector 160 are moved farther away from one of a plurality of positions (S1, S2, S3) of a source, the angle of incidence decreases and the diffracted x-rays are focused past the detector 160, with the x-rays still being measured by the detector 160.

The distance S1, S2, S3 from the source 150 to the disk 110 is then calibrated to photon energy using Equations (2) and (3):

$$\text{energy}=12.4/2d^*\sin(\text{angle}) \quad (2)$$

$$\tan(\text{angle})=\text{radius of crystal ring/source distance} \quad (3)$$

For a crystal with known crystallographic spacing, a finite range of energy is identified for a given distance between the disk 110 and the detector 160, based on an active area of the detector 160. An accessible energy range is determined based on a range of angles that allow the diffracted x-rays to strike the active area of the detector. The range is shifted by changing a distance between the disk 110 and the detector 150. Ranges can also be accessed by choosing crystals with different crystallographic spacings, with an accessible energy range being varied by changing the defracting element to a defracting element having different crystallographic spacings. Other thin crystal materials can be bent into the cylinder, and less flexible materials can be segmented into a number of flats oriented into the cylinder, with only a slight degradation in resolution and throughput.

Figure 2:
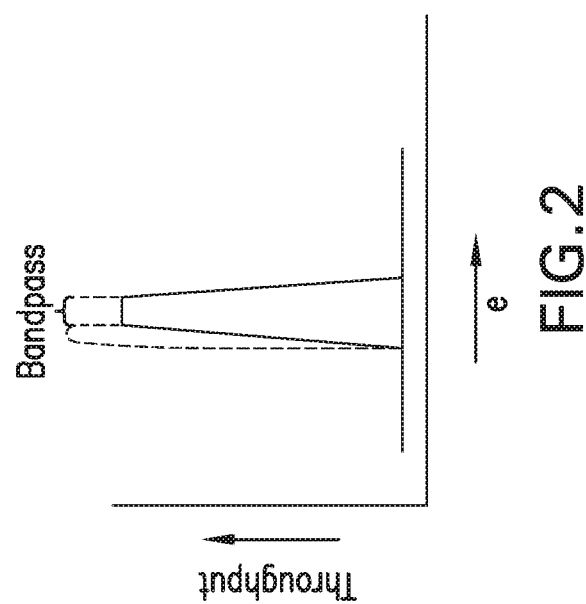
FIG. 2 is a graph showing energy resolution of an embodiment of the present disclosure.

FIG. 2 is a graph showing energy resolution of an embodiment of the present disclosure.

In FIG. 2, energy and throughput are shown on the x and y axes, respectively. Energy resolution, or sharpness of the edges of a bandpass window, is a function of source size, owing to the slight spread of angles coming from different parts of the source however small, as illustrated at the far left of FIG. 2.

Figure 3:
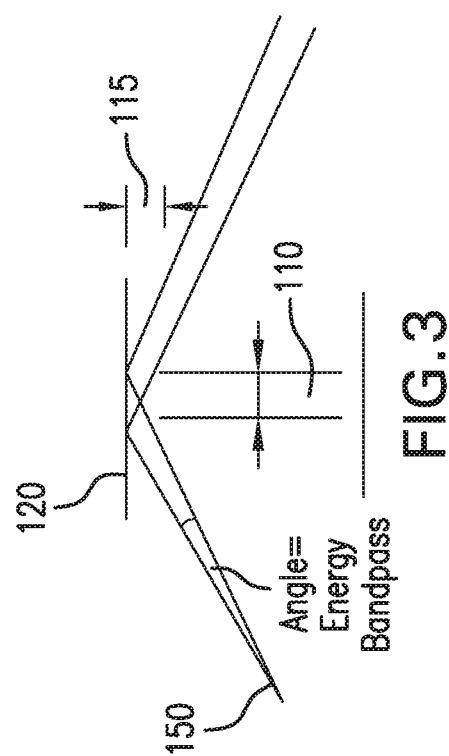
FIG. 3 is an expanded view of FIG. 1 that illustrates an angle of energy bandpass of the present disclosure.

FIG. 3 is an expanded view of FIG. 1 that illustrates an angle of energy bandpass of the present disclosure. The angle of energy bandpass is a range of energies diffracted by the crystal 120, as a function of the incident angle. FIG. 3 shows an aperture 115 between the disk 110 and the crystal 120, and a thickness of the disk 110. The thickness of the disk 110 can vary, or the disk can be split into thinner pieces with adjustable spacing therebetween. Changing a thickness of the disk 110 changes energy broadcast to the detector 160, and changes the angle of incidence, with the accessible energy range being determined based on a range of angles that are determined to allow diffracted x-rays to strike the active area of the detector 160.

Figure 4:
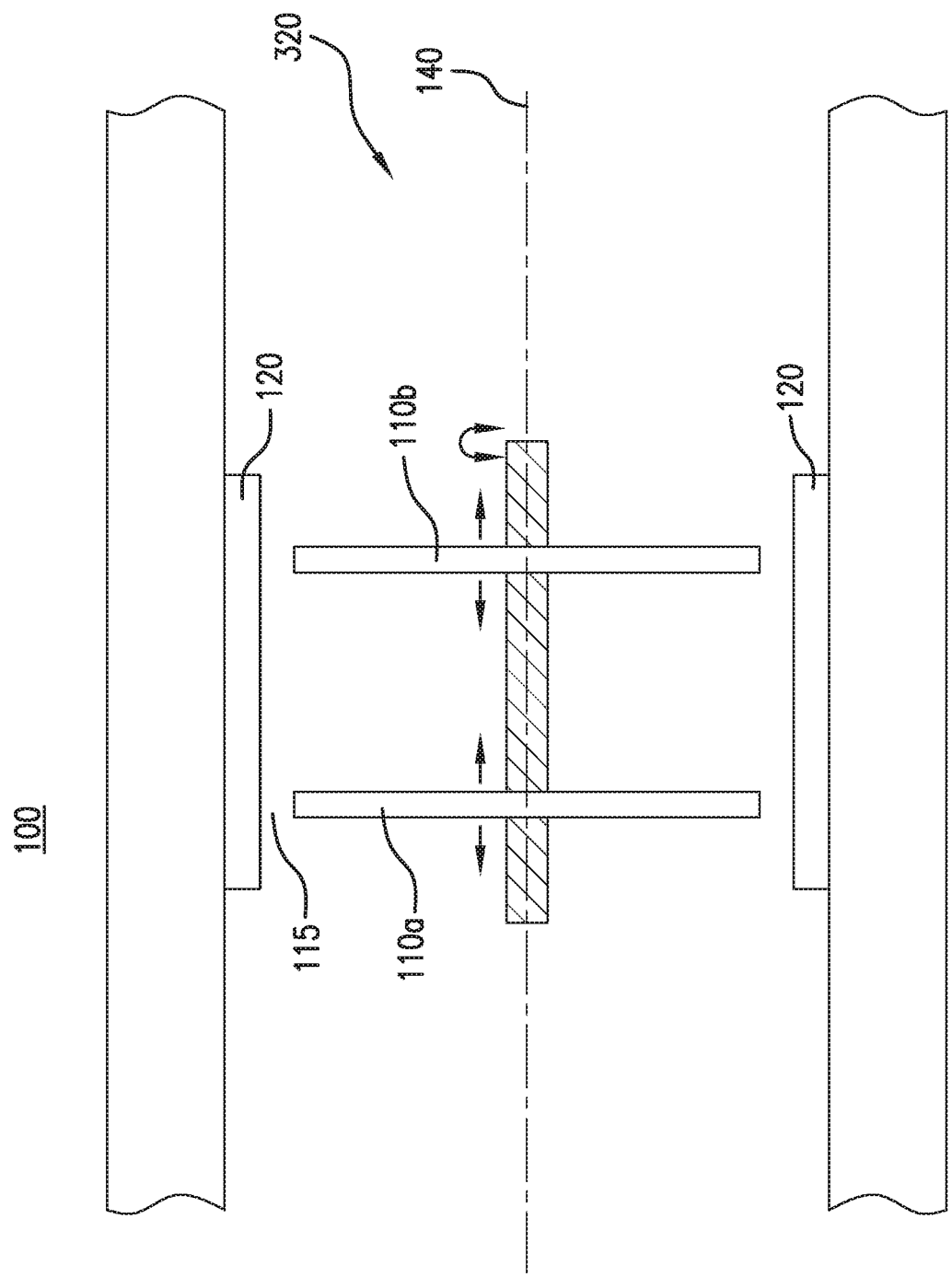
FIG. 4 is profile view of an interior of an embodiment of the apparatus of the present disclosure.

As shown in FIG. 4, which provides a profile view of an interior of an embodiment of the apparatus of the present disclosure, a plurality of disks 110a, 110b are provided. Each of the plurality of disks 110a, 110b has an edge defining a respective circle that aligns with the defracting element 120. One disk 110a is movable with respect to the other disk 110b along the optical axis 140 of the hollow cylinder 320. The angle of incidence changes by varying the distance between the two disks 110a, 110b, i.e., separating the edge of a first disk 110a away from or closer to the edge of the second disk 110b. Varying the distance between the two disks 110a, 110b adjusts the angle or range of angles, and modifies the energy bypass to tune the bandpass to match specific applications and to enhance versatility and match additional applications.

Figure 6:
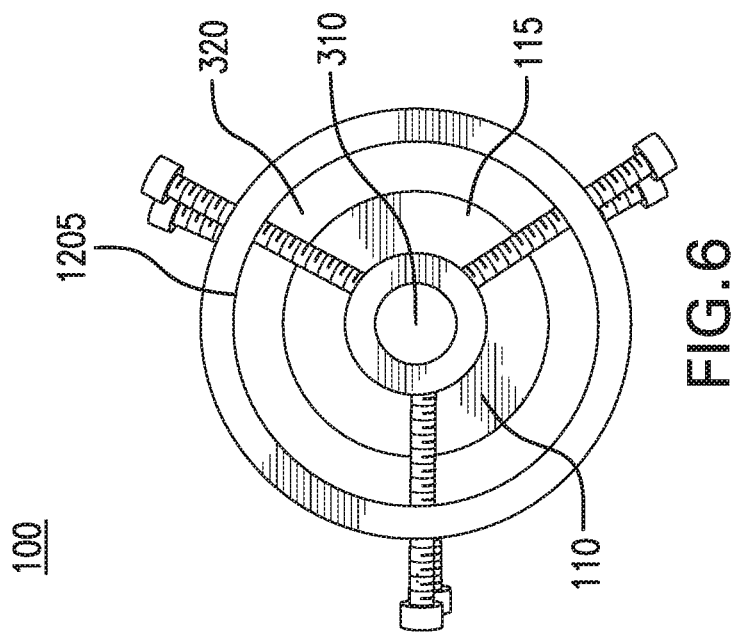
FIG. 6 is a front view of the apparatus of an embodiment of the present disclosure.
Figure 5:
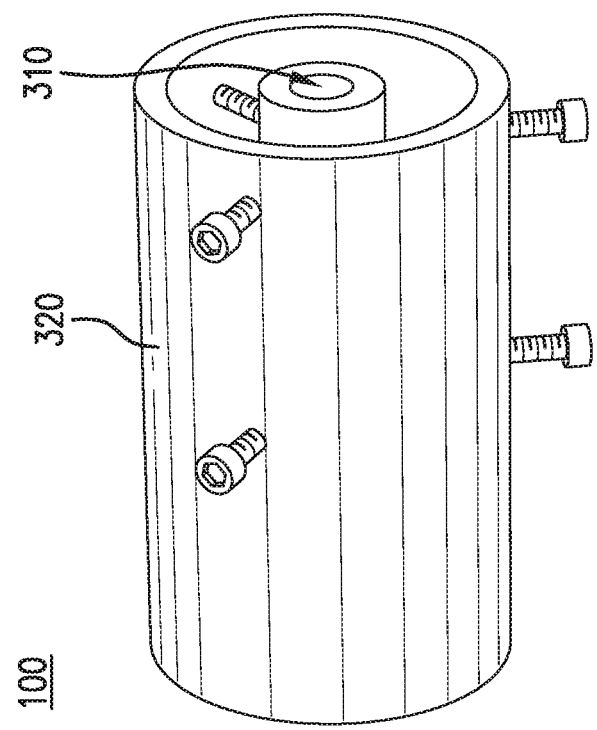
FIG. 5 is a perspective view of an embodiment of the apparatus of the present disclosure.

FIG. 5 is a perspective view of an apparatus of the present disclosure. FIG. 6 is a front view of an apparatus of the present disclosure.

As shown in FIGS. 5 and 6, a hole 310 traverses a center of the apparatus. The hole 310 is preferably plugged when the spectrometer is in use. The spectrometer focusing apparatus 100 is mounted onto a detector 160 using the hole 310 by screw or similar attachment. The spectrometer focusing apparatus 100 has a length of several inches and a width of approximately half the length, and is approximately ten times smaller than conventional spectrometers.

The apparatus of FIGS. 1 and 3-6 includes a diffracting element, e.g., a crystal, that forms an inner circumference of a cylinder 320 of the spectrometer 100. The diffracting element and an outer edge of the disk 110 are provided on the optic axis 140 to define an aperture 115 having a uniform circular shape. The diffracting element and the outer edge of the disk 110 are provided at a same position along a length of the cylinder 320. The disk 110 fills a portion of an interior of the cylinder 320, with the edge of the disk 110 positioned transverse to a lengthwise direction of the cylinder 320 that corresponds to the optic axis 140.

The disk 110 is positioned adjacent to the diffracting element 120, with an aperture 115 formed between the diffracting element 120 and the edge of the disk 110, to permit electron passage from the source to the detector, as shown in FIGS. 1 and 3.

Energy is selected by adjusting a distance between the spectrometer and the sample, thereby determining the angle, while the detector can be stationary or can attach to and travel with the spectrometer.

Accordingly, a compact apparatus is provided that improves medium resolution energy resolution, i.e., approximately 10 to 100 eV, of conventional counting or energy-dispersive detectors, and provides a simple and cost-effective way to discriminate between x-ray fluorescence or emission energies that are less than 150 eV apart, for both synchrotron-based and laboratory sources.

The spectrometer focusing apparatus uses only one or more disks to limit the angle of incidence, and energy is selected by scanning an entire assembly of the detector and spectrometer focusing apparatus. The scanning is performed toward or away from the sample, providing an advantage of only having to control one motion, thereby simplifying operation. An additional advantage that is provided is only specifying a single point of diffraction along the diffractor, thereby eliminating variation in efficiency that can arise from inconsistencies along the diffractor. Another advantage is providing a simplified structure that can be readily affixed to various commercial detectors, in alignment with a sample position, to scan energy/wavelength simply by moving the detector toward or away from the sample, without adding moving parts to operability over energy ranges that do not depend on precisely equal diffraction at different positions along a defracting element, such as a single crystal ring that can be used for all energy ranges.

The spectrometer focusing apparatus operates with simple counting or solid state detectors, and does not require more expensive specialized strip or area detectors.

Figure 7:
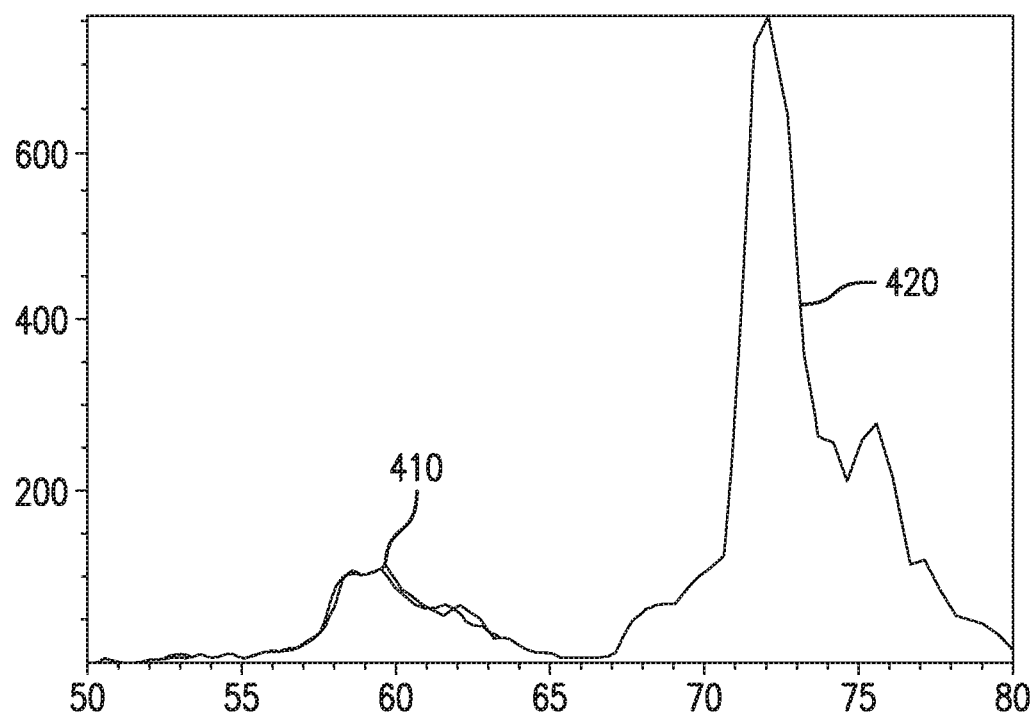
FIG. 7 is a graph of experimental results utilizing the apparatus of the present disclosure.

FIG. 7 is a graph illustrating results of testing utilizing the spectrometer focusing apparatus 100. The testing was conducted by attaching spectrometer focusing apparatus 100 to a Canberra Ge solid-state detector. A source was provided of Ni Ka (and Kb) fluorescence from a roughly 10 micron spot illuminated by higher-energy x-rays in an x-ray fluorescence microprobe. The spectrometer-to-sample distance was varied while monitoring the Ni Ka and Kb signal reaching the detector.

FIG. 7 shows intensity in arbitrary units versus position of the spectrometer focusing apparatus, with energy decreasing to the right of FIG. 7.

In FIG. 7, line 420 corresponds to Ni Ka fluorescence, and lines 410 correspond to Ni Kb fluorescence, which is about 800 eV higher energy, demonstrating that the spectrometer focusing apparatus can successfully isolate the two different fluorescence energies. The Ka peak has a width (full width at half maximum) of about 135 eV, which is significantly better than the energy resolution of a Ge detector (approximately 165 eV, FWHM). The structured intensity shown in FIG. 7 just outside the main peak is due to imperfect test alignment. However, throughput, i.e., efficiency, is on the order of 0.2% of the total fluorescence that the 100 square mm detector area would see from the same source.

While the disclosure has been shown and described with reference to certain embodiments thereof, it will be understood by those skilled in the art that various changes in form and detail may be made therein without departing from the spirit and scope of the invention as defined by the appended claims and equivalents thereof.

What is claimed is:

1. A spectrometer focusing apparatus, the apparatus comprising:
    a hollow cylinder configured for x-rays to traverse a length thereof;
    a defracting element configured as a ring on an interior circumference of a portion of the hollow cylinder;
    at least two disks, each disk having an edge defining a respective circle; and
    an aperture formed between the defracting element and the edge of the first disk of the at least two disks,
    wherein the first disk of the at least two disks is movable with respect to an other disk of the at least two disks along an optical axis of the hollow cylinder.

2. The apparatus of claim 1, wherein the aperture is circular shaped.

3. The apparatus of claim 1, wherein the cylinder is configured to attach to one of a counting detector, an energy-dispersive detector, and a Canberra Ge solid-state detector.

4. The apparatus of claim 1, wherein an accessible energy range is varied by changing the defracting element to a defracting element having different crystallographic spacings.

5. The apparatus of claim 1, wherein an angle of incidence changes by varying a distance separating the at least two disks.

6. The apparatus of claim 1, wherein, when attached to a detector, the apparatus is configured to improve energy resolution of the spectrometer by approximately 10 eV to 100 eV.

7. The apparatus of claim 6, wherein an accessible energy range is determined based on a range of angles that are determined to allow diffracted x-rays to strike an active area of the detector.

8. The apparatus of claim 6, wherein a position of an x-ray source defines an angle of incidence of x-rays transmitted from the x-ray source through the aperture to the detector.

9. A method for focusing a spectrometer, the method comprising:
    affixing a cylinder to one of a counting detector, an energy-dispersive detector, and a Canberra Ge solid-state detector, wherein the cylinder comprises:
        a hollow configured for x-rays to traverse a length thereof,
        a defracting element configured as a ring on an interior circumference of a portion of the hollow,
        at least two disks, each disk having an edge defining a respective circle, and
        an aperture formed between the defracting element and the edge of the first disk of the at least two disks, and
    changing an angle of incidence by varying a distance separating the at least two disks.

10. The method of claim 9, wherein the aperture is circular shaped.

11. The method of claim 9, wherein energy resolution of the spectrometer is improved by approximately 10 eV to 100 eV.

12. The method of claim 9, wherein an accessible energy range is varied by changing crystallographic spacings of the defracting element.

13. The method of claim 9, wherein the first disk of the at least two disks is movable with respect to an other disk of the at least two disks along an optical axis of the hollow.

\* \* \* \* \*